(12) United States Patent
Zimmermann

(10) Patent No.: US 7,275,633 B2
(45) Date of Patent: Oct. 2, 2007

(54) DEVICE FOR CHANGING THE DIRECTION OF CONVEYANCE OF FLAT POSTAL ITEMS AND THE POSITION OF THE POSTAL ITEMS RELATIVE TO THEIR DIRECTION OF CONVEYANCE

(75) Inventor: Armin Zimmermann, Constance (DE)

(73) Assignee: Siemens AG, München (DE)

( * ) Notice: Subject to any disclaimer, the term of this patent is extended or adjusted under 35 U.S.C. 154(b) by 140 days.

(21) Appl. No.: 11/236,873

(22) PCT Filed: Mar. 25, 2004

(86) PCT No.: PCT/EP2004/003146

§ 371 (c)(1),
(2), (4) Date: Sep. 28, 2005

(87) PCT Pub. No.: WO2004/089790

PCT Pub. Date: Oct. 21, 2004

(65) Prior Publication Data

US 2006/0180431 A1 Aug. 17, 2006

(30) Foreign Application Priority Data

Apr. 9, 2003 (DE) .............................. 103 16 235

(51) Int. Cl.
*B65G 29/00* (2006.01)
(52) U.S. Cl. .............................. 198/474.1; 271/10.08; 271/10.1; 271/82
(58) Field of Classification Search ............... 198/404, 198/412, 414, 474.1, 575, 460.2, 803.4; 271/10.08, 271/10.1, 82, 69, 2

See application file for complete search history.

(56) References Cited

U.S. PATENT DOCUMENTS

| 2,895,588 | A |   | 7/1959  | Van Marle              |
|-----------|---|---|---------|------------------------|
| 3,847,273 | A | * | 11/1974 | Buhayar ....... 198/377.07 |
| 3,887,065 | A | * | 6/1975  | Verjux ............ 198/404 |
| 4,506,779 | A | * | 3/1985  | Seragnoli ...... 198/459.1 |
| 4,511,027 | A | * | 4/1985  | Zamboni ....... 198/470.1 |
| 4,726,876 | A | * | 2/1988  | Tomsovic, Jr. ..... 156/552 |

(Continued)

FOREIGN PATENT DOCUMENTS

DE   1 137 993 B   10/1962

(Continued)

OTHER PUBLICATIONS

Abstract—DE 1 137 993 B Oct. 11, 1962 Siemens AG.

*Primary Examiner*—Douglas A Hess

(57) ABSTRACT

A device for changing a direction of conveyance of flat postal items and a position of the postal items relative to their direction of conveyance includes a driven carousel tray to which one or more gripper arms whose lengths are modifiable in a controlled manner are fastened. At free ends of these arms controlled joint ends having two or three degrees of freedom are provided and grippers are attached thereto. The gripper arm lengths, the spatial orientations of the grippers during rotation and the rotation speed can be controlled in such a manner that the grippers carry out linear movements along the conveyor tracks of the conveyor means to be supplied and carried away at approximately the same speed of conveyance as the respective conveyor means. During the linear movements, the joint ends and the grippers are oriented in the same spatial orientation relative to the respective conveyor tracks.

5 Claims, 2 Drawing Sheets

U.S. PATENT DOCUMENTS

Figure 1:
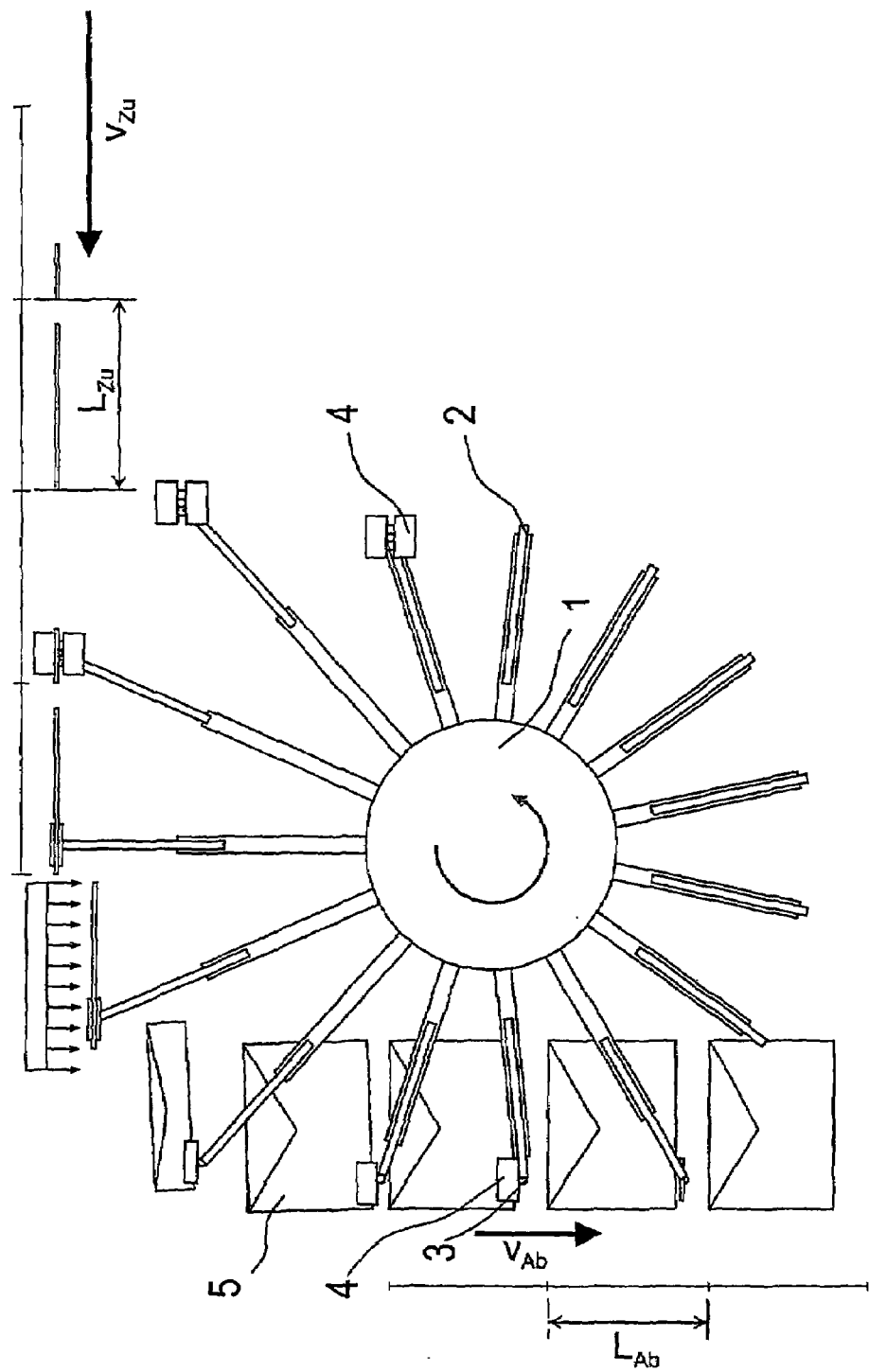

| | | | |
|---|---|---|---|
| 4,880,102 A * | 11/1989 | Indrebo | 198/418.3 |
| 4,938,341 A * | 7/1990 | Bogatzki | 198/474.1 |
| 4,995,223 A * | 2/1991 | Spatafora et al. | 53/176 |
| 5,257,888 A * | 11/1993 | Kronseder | 414/416.06 |
| 5,353,909 A * | 10/1994 | Mukai et al. | 198/343.2 |
| 5,769,205 A * | 6/1998 | Belvederi et al. | 198/475.1 |
| 5,927,473 A * | 7/1999 | Draghetti | 198/474.1 |
| 6,264,192 B1 * | 7/2001 | Siebenmann et al. | 271/205 |
| 6,296,434 B1 * | 10/2001 | Sato | 414/223.01 |
| 6,719,031 B2 * | 4/2004 | Sawai | 156/519 |
| 6,848,566 B2 * | 2/2005 | Harnish et al. | 198/459.8 |
| 2002/0079199 A1 | 6/2002 | Wipf et al. | |

FOREIGN PATENT DOCUMENTS

WO    WO 98/49 083 A2    11/1998

* cited by examiner

DEVICE FOR CHANGING THE DIRECTION OF CONVEYANCE OF FLAT POSTAL ITEMS AND THE POSITION OF THE POSTAL ITEMS RELATIVE TO THEIR DIRECTION OF CONVEYANCE

The invention relates to a device for changing the direction of conveyance of flat postal items and the position of the postal items relative to their direction of conveyance.

As a result of their advantageous extraction position in the input unit of sorting machines the postal items are initially transported after separation in a longitudinal direction standing on their narrow sides. Afterwards, especially with sorting machines for large letters, periodicals etc. the postal items are turned around their longitudinal axis into a lying position and are transported onwards lying on a conveyor belt. To eject the postal items quickly and safely into sorting containers when they are sorted, the direction of transport must be changed from longitudinal to transverse since this achieves a better ejection position in the item containers. This change of transport position in the stream of items is achieved by a change of direction of the speed vector by 90°. To this end in accordance with WO98/49083 A2 the postal items are suddenly accelerated from the conveyor belt with a transverse pusher device, which makes them leave the conveyor belt, slide onto a further conveyor belt arranged at 90° and be conveyed onwards on this belt. The impact shock on the postal items by the transverse pusher frequently leads to the postal items being bounced or rotated or to kinking or folding of thin, delicate or partly filled postal items In addition high material stresses as well as a difficult-to-overcome oscillation behavior of the pusher system should be mentioned.

A device is known from DE 1 137 993 A in which the direction of conveyance of the postal items and their absolute position in space, but not however their position relative to the direction of conveyance can be changed. In this known arrangement the postal items are gripped and released by the device during straight-line movement in each case by grippers.

Furthermore the postal items have to be aligned on one edge in front of read and print modules. This is done in inspection paths, in which, by means of transverse roller, as well as a speed vector in the direction of conveyance, another speed vector across the direction of conveyance is imparted to the postal items by which they are directed onto a stop to which they align themselves. The stop is embodied as a side conveyor. Since the necessary force also has to be exercised for large and heavy postal items, the delicate postal items are frequently kinked or folded on the stop. The postal items which are lying flat must also be diverted during processing and moved into different conveyance levels. This is done by means of curved belts and diverters as well as riser tracks, all of which takes up a great deal of space. In addition there is a danger of the postal items being twisted and displaced here.

The object of the invention is to create a device for changing the direction of conveyance of flat postal items and the position of the postal items relative to their direction of conveyance with which stress on the postal items can largely be avoided and which requires little space.

In accordance with the invention the object is achieved by a device for changing a direction of conveyance of flat postal items and a position of the postal items relative to their direction of conveyance. The device includes a feed conveyor arranged to feed the postal items on a conveyor track with a speed of conveyance $v_{Zu}$ such that the postal items are carried away from the device by a conveyor on a second conveyor track with a changed direction of conveyance end a speed of conveyance $V_{Ah}$, a driven carousel tray arranged to be fastened with one or more gripper arms with lengths which can be modified in a controlled manner, and controlled joint ends having two or three degrees of freedom and arranged at free ends of the gripper arms to which grippers are attached. The lengths of the gripper arms, the spatial orientations of the grippers during the rotation and the speed of rotation are controlled such that the grippers execute linear movements along the conveyor tracks of the feeder and ejector conveyors with the approximate transport speed of the relevant conveyor. During the linear movements the joint ends with the grippers are always in the same spatial alignment to the relevant conveyor tracks. The postal items are gripped and put down by the grippers.

Advantageous embodiments of the invention are presented in the subclaims.

Thus it is advantageous to synchronize the movement of the postal items in the conveyors and the movement of the grippers to ensure that each postal item is transferred from the feed conveyor into the gripper and from the gripper onto the outgoing conveyor. It is also especially advantageous to select the lengths, spacings and speeds of rotation of the gripper arms as well as the distance between the center point of the carousel tray and the conveyor tracks such that the postal items so can picked up or put down at the speed of conveyance with a defined spacing of the front edges or the rear edges and at a defined distance from a side reference edge of the side boundaries of the conveyor tracks.

The gripper arms can be embodied at low cost as telescopic arms.

In a favorable embodiment the grippers are embodied as clasps with at least one movable jaw.

In order to grip or put down the postal items at different heights it is advantageous for the gripper arms to be hinged in a controllable vertical direction.

The invention will be explained below with reference to the drawing in an exemplary embodiment.

The Figures show

Figure 2:
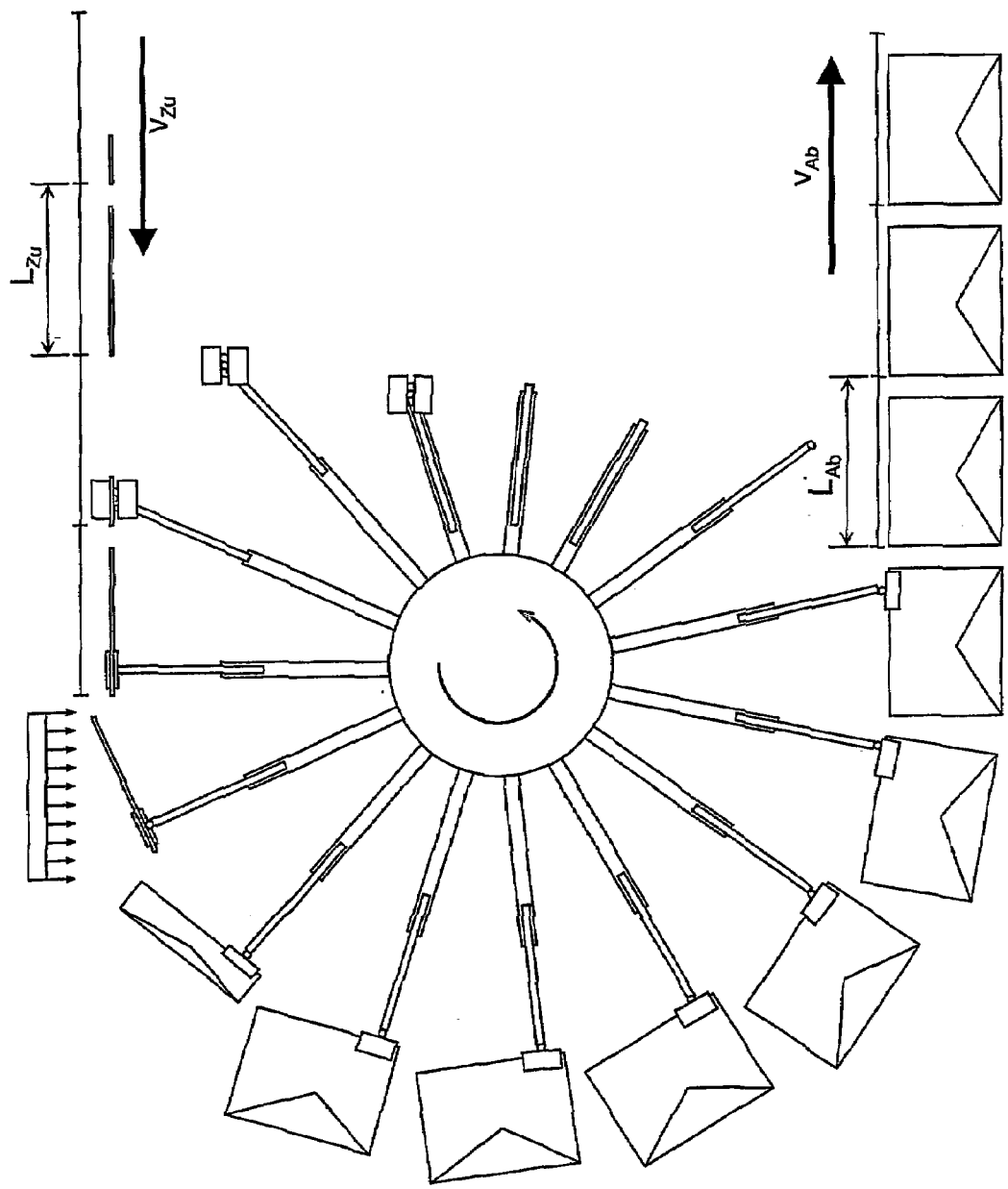

FIG. 1 a schematic overhead view of a generic device for turning flat postal items standing on their long narrow sides in the direction of conveyance into a lying position and changing the direction of conveyance by 90°, in which case the long sides of the items lie at right angles to the new direction of conveyance and whereby only one gripper arm is shown in different positions during a rotation;

FIG. 2 a corresponding schematic view from above, which differs from the view shown in FIG. 1 in that the direction of conveyance is changed by 180° and that then the shorter sides of the items lie at right angles to the new direction of conveyance.

As shown in FIG. 1, a continuously rotating carousel tray 1 with constant or increasing speed, on which one or more gripper arms are located, is the core of the device. To make the diagram easier to understand, only one gripper arm 2 is shown at different points in time during the rotation of the carousel tray 1. The length of the gripper arm embodied as a telescopic arm can be changed in a controlled manner. In addition the gripper arms 2 can be hinged in a controlled manner in a vertical direction. At the free end of the gripper arms 2 there are joint ends 3, which can be moved in a controlled manner with two or three degrees of freedom and which each carry a gripper 4, e.g. a closable clasp. for picking up and putting down postal items. If the speed of rotation is not constant it should be ensured that with unequal conveyor speeds of feed and removal conveyors postal items 5 are not accepted and put down simultaneously.

A supply conveyor embodied as a covered belt is arranged above the rotating gripper arms 2 such that it forms a tangent to the circle of rotation of the gripper arm 2 extended to its maximum. The narrow covered belt conveys postal items 5 standing on edge with a feed speed $v_{Zu}$ and a constant spacing of the same edges $L_{Zu}$, with the lower section of the postal item protruding freely from the covered belt. At the point at which the front edge of a postal item or its rear edge intersects the circle of rotation of the gripper arm 2 extended to its maximum length, a gripper arm 2 with an opened gripper 4, aligned to the covered belt track must also be at the intersection point. From this point on the gripper arm 2 is continuously shortened at a constant speed of rotation, with the gripper 4 executing a linear movement synchronous to the movement of the postal item and the joint end 3 being continuously turned in the plane of rotation, with the gripper 4 always remaining aligned to the covered belt track. In this phase 1, which lasts until the postal item 5 or the gripper 4 is at a right angle to the gripper arm 2, the tangential speed of the gripper 4 is the same as the feed speed $v_{Zu}$. Since during phase 1 a synchronous sequence of movement between gripper 4 and postal item 5 is achieved, i.e. in no difference speed is present, the gripper 4 can be closed around the bottom part of the postal item protruding from the covered belt and the postal item 5 can leave the covered belts in a clasped state without any sudden force being imposed on the postal items.

After it leaves the covered belt, in phase 2 the position of a reference edge to which the item is to be aligned to the gripper 4 is detected for example by means of a row of light curtains and the joint end 3 is hinged 90° downwards, which transfers the postal item 5. In parallel to this the length of the gripper arm is continuously changed to the length corresponding to be defined edge spacing Lpb of the postal items 5 lying flat, moving on a straight track at right angles to the feed direction minus the detected correction value of reference edge to the gripper 4 and the joint end 3, to retain the straight alignment when the item is carried away is continuously rotated in the plane of rotation minus a detected correction value of a possible reference edge movement to gripper 4. The turning, the change of edge and the alignment is thus completed harmoniously (without shocks).

An conveyor for carrying away the items embodied as a flat belt, a roller conveyor or similar, is arranged offset at 90° to the feeding covered belt below the rotating gripper arms 2 and also forms a tangent to the circle of rotation of the gripper arms 2 extended to their maximum length. Similarly to the postal item feed transfer, the transfer of the postal items to the removal flat belt conveyor occurs synchronously in phase 3. The prespecified constant spacing of the same edges $L_{Ab}$ and the removal speed $V_{Ab}$, can be determined by the gripper arm length and the transfer speed $N_{\ddot{U}g}$. In the execution sequence in accordance with FIG. 2 the direction of conveyance is changed by 180°, with the postal items 5 also being moved from the standing position into a lying position with edge alignment. Phase 1 thus executes as shown an FIG. 1, but in phase 2 the joint end 3 is not continuously rotated in the plane of rotation but only by the detected correction value of reference edge movement to gripper 4, and in phase 3 one or more outgoing belts can be arranged at different levels, in which case the gripper arms 2 can be hinged in a controlled manner in a vertical direction in a similar way to what are known as octopus rides in amusement parks, to implement the transfer to different levels.

The invention claims is:

1. A device for changing a direction of conveyance of flat postal items and a position of the postal items relative to their direction of conveyance, comprising:

a feed conveyor arranged to feed the postal items on a conveyor track with a speed of conveyance $v_{Zu}$ such that the postal items are carried away from the device by a conveyor on a second conveyor track with a changed direction of conveyance and a speed of conveyance $V_{Ab}$, a driven carousel tray arranged to be fastened with one or more gripper arms with lengths which can be modified in a controlled manner, controlled joint ends having two or three degrees of freedom and arranged at free ends of the gripper arms to which grippers are attached, wherein the speed of rotation of the carousel tray and during the rotation of the carousel tray the lengths of the gripper arms as well as the spatial orientation of the grippers are arranged to be controlled in such a way that the grippers execute linear movements along the first conveyor track with approximately the speed $v_{Zu}$ and along the second conveyor track with approximately the speed $v_{Ab}$, wherein during the linear movements the spatial orientation of the joint ends remain the same as the orientation of the grippers to the relevant transport track, and wherein the postal items are gripped and put down by the grippers during their linear movements.

2. The device according to claim 1, wherein the movement of the postal items in the conveyors and the movement of the gripper arms and gripper are synchronized to ensure that each postal item is transferred from the feed conveyor into the gripper and from the gripper onto the outgoing conveyor.

3. The device according to claim 1, wherein the gripper arms are telescopic arms.

4. The device according to claim 1, wherein the grippers comprise clasps with at least one movable jaw.

5. The device according to claim 1, wherein the gripper arms are hinged in a vertical direction in a controlled manner.

* * * * *